United States Patent [19]
Teichmann

[11] Patent Number: 6,026,860
[45] Date of Patent: Feb. 22, 2000

[54] SOLENOID VALVE APPARATUS FOR TWO END-USERS

[75] Inventor: Andreas Teichmann, Isernhagen, Germany

[73] Assignee: WABCO GmbH, Hannover, Germany

[21] Appl. No.: 09/118,466

[22] Filed: Jul. 17, 1998

[30] Foreign Application Priority Data

Jul. 22, 1997 [DE] Germany .......................... 197 31 402

[51] Int. Cl.⁷ ................................................. F16K 31/04
[52] U.S. Cl. ........................................ 137/870; 251/129.1
[58] Field of Search .......................... 137/870; 251/129.1

[56] References Cited

U.S. PATENT DOCUMENTS

| | | | |
|---|---|---|---|
| 2,322,911 | 6/1943 | Beam | 251/129.01 |
| 3,842,860 | 10/1974 | Stampfli | 137/596.17 |
| 4,506,701 | 3/1985 | Masaki et al. | 137/596.17 |
| 4,559,971 | 12/1985 | Bradshaw | 137/596.17 |

FOREIGN PATENT DOCUMENTS

| | | |
|---|---|---|
| 033452 | 9/1989 | European Pat. Off. . |
| 21 35 047 | 1/1973 | Germany . |
| 35 01 708 | 7/1986 | Germany . |
| 40 35 255 | 5/1991 | Germany . |

*Primary Examiner*—John Fox
*Attorney, Agent, or Firm*—Proskauer Rose LLP

[57] ABSTRACT

A solenoid valve apparatus, for supplying two end-users from a single pressure fluid source, includes two valves and a solenoid apparatus for actuating the two valves. The two valves are installed opposite each other, and the solenoid apparatus is located between the two valves. The solenoid apparatus contains two armatures configured as movable valve elements, which are approximately coaxial with each other. A coil surrounds the two armatures over at least part of their axial extensions. A pressure fluid channel connects the pressure fluid inlet of one valve to the pressure fluid inlet of the other valve. Each valve has a corresponding pressure fluid outlet, which connects to a respective end-user pressure fluid chamber.

17 Claims, 1 Drawing Sheet

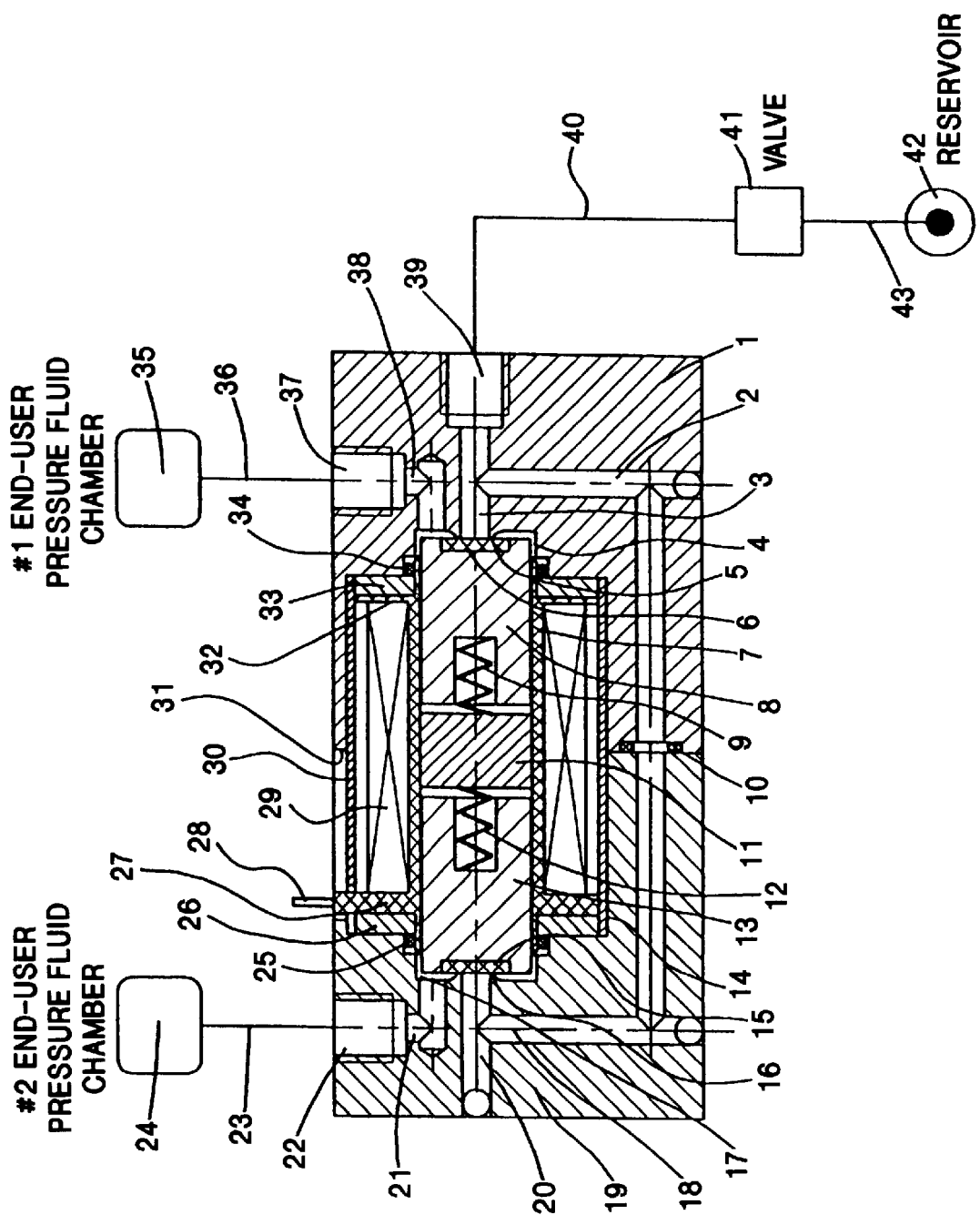

SOLENOID VALVE APPARATUS FOR TWO END-USERS

FIELD OF THE INVENTION

The present invention relates to a solenoid valve apparatus. More specifically, the present invention relates to a solenoid valve apparatus for supplying two end-users from a single pressure fluid source.

BACKGROUND OF THE INVENTION

A typical prior art solenoid valve apparatus consists essentially of two valves, and one solenoid for the actuation of the two valves. The solenoid has two armatures, one coil, and one core. The first valve is a 3/2-way valve, via which the end-user can be connected at will to a pressure fluid source or to a pressure fluid sink. The second valve, which is a switch-controlled throttle, precedes the first valve.

In a first switch position of the first and second valves, the pressure fluid goes from the pressure fluid source through a large cross-section passage of the second valve, and through the first valve to the end-user, without being throttled.

In a second switch position of the first and second valves, the end-user is shut off from the pressure fluid source by means of the first valve, and is connected to the pressure fluid sink. The pressure fluid then travels in a throttled state, via a small cross-section passage of the second valve, from the pressure fluid source to the pressure fluid inlet of the first valve. If the two valves are again switched over, with the second valve returning (with delay) to its first switch position, the pressure fluid flows in a throttled state from the pressure fluid source to the end-user. As soon as the second valve has returned to its first switch position, the pressure fluid flows from the pressure fluid source to the end-user, without being throttled.

This prior art solenoid valve apparatus is simple and compact in structure. However, without any additional measures being taken, it can only be used to control the pressure for one end-user.

Therefore, an object of the present invention is to create a simple solenoid valve apparatus of the type described above, with which it is possible to connect two end-users to a pressure fluid source, as well as to close off the two end-users from the pressure fluid source.

The present invention offers the advantage of providing a solenoid valve apparatus which carries out more functions than the prior art solenoid valve apparatus, but which also has a simple and compact structure.

It is a special advantage of the inventive solenoid valve apparatus that not only can two end-users be selectively connected to, or closed off from, a pressure fluid source or a pressure fluid sink, but in addition, the two end-users can also be closed off from each other.

It is also possible to omit the installation of a core in the inventive solenoid valve apparatus, without significantly reducing the effectiveness of the inventive solenoid valve apparatus. The core could be replaced by a separating wall that is as thin as possible, and is made in one piece with an armature-guiding tube, so that it subdivides the armature-guiding tube into two segments.

SUMMARY OF THE INVENTION

In accordance with an illustrative embodiment of the present invention, a solenoid valve apparatus for connecting two end-users to a pressure fluid source includes a first valve with a first movable valve element, and a second valve with a second movable valve element. A first pressure fluid inlet and a first pressure fluid outlet are connected to the first valve, and a second pressure fluid inlet and a second pressure fluid outlet are connected to the second valve.

A solenoid apparatus, for actuating the first and second valves, includes a first armature associated with the first valve, a second armature associated with the second valve, and an electromagnetic coil. The first and second armatures are approximately coaxial with each other, and are wholly or partially surrounded by the coil. The armatures are located between the first and second valves, and are capable of movement in the direction of, or away from, their respective valves.

A pressure fluid channel connects the pressure fluid inlet of the first valve to the pressure fluid inlet of the second valve. The pressure fluid outlet of the first valve is connected to a first end-user, and the pressure fluid outlet of the second valve is connected to a second end-user.

An illustrative embodiment of the present invention is more fully described below in conjunction with the following drawing.

BRIEF DESCRIPTION OF THE DRAWING

A solenoid valve apparatus, in accordance with the present invention, is shown in the drawing.

DETAILED DESCRIPTION OF THE INVENTION

The drawing shows a solenoid valve apparatus with two valves connected in parallel. According to the drawing, a first valve (5, 6, 8) and a second valve (16, 15, 13) are installed in a housing (1, 19). The housing consists of a first housing part (1) and a second housing part (19), which are connected to each other by connecting means, e.g., screws, which are not shown. The first valve (5, 6, 8) is formed by a first ring-shaped valve seat (5), located on the bottom of the housing part (1), and a first valve element (6, 8), which can be moved in the direction of the first valve seat (5), or away from it. The second valve (16, 15, 13) is formed by a second ring-shaped valve seat (16), located on the bottom of the second housing part (19), and a second valve element (15, 13), which can be moved in the direction of the second valve seat (16), or away from it. The first valve (5, 6, 8) and the second valve (16, 15, 13) are located across from each other, and are installed in the housing (1, 19), so as to have the same approximate axis.

The first valve element (6, 8) consists of a first armature (8), made of a magnetically conductive material, and of a sealing element (6), which is located on the side of the first armature (8) towards the valve seat (5). In the same manner, the second valve element (15, 13) is formed by a second armature (13), made of a magnetically conductive material, and a sealing element (15), which is located on the side of the second armature (13) towards the second valve seat (16). The two armatures (8 and 13) are approximately coaxial, relative to the two valves (5, 6, 8 and 16, 15, 13, respectively), or to the two valve seats (5 and 16). The sealing elements (6 and 15) may be made of plastic or rubber. The armatures (8 and 13), thus installed between the first valve seat (5) and the second valve seat (16) of the two valves (5, 6, 8 and 16, 15, 13, respectively), are moved glidingly in an armature-guiding tube (7).

The armature-guiding tube (7) is a component of a coil support (7, 32, 27), which consists of the armature-guiding tube (7) and two surrounding projections (32 and 27) of the armature-guiding tube (7). Projections 32 and 27 extend radially outward, and are located on the armature-guiding tube (7), near its ends.

The coil support (7, 32, 27) is made of a magnetically non-conductive material, e.g., plastic. A coil (29) is installed on the armature-guiding tube (7), in the area between the two surrounding projections (32 and 27). The coil (29) surrounds the coil support (7, 32, 27), and thereby also the armature-guiding tube (7) and the two armatures (8 and 13), over at least part of their axial extension. A core (11) is installed in the armature guiding tube (7) between the sides of the two armatures (8 and 13), which face each other. Core (11) is made of a magnetically conductive material. A first spring (9), serving as a return force for the first valve element (6, 8), is located between the core (11) and the first armature (8). First spring (9) bears at one end on the core (11), and pushes the armature (8) at the other end, in the direction of the first valve seat (5). In the same manner, a second spring (12) is located between the core (11) and the second armature (13), and serves as a return force for the second valve element (15, 13). Second spring (12) bears at one end upon the core (11), and at the other end, pushes the second armature (13) in the direction of the second valve seat (16).

The coil support (7, 32, 27) and the coil (29) are located within a tubular body made of a magnetically conductive material, whereby the tubular body serves as an outer conduction element (30), i.e., as an outer yoke to conduct the magnetic fields.

A first additional outer conduction element (33) is installed on the side of the coil support (7, 32, 27) towards the first valve (5, 6, 8), in the shape of an annular disk. Conduction element (33) is made of a magnetically conductive material. A second outer conduction element (26), in the shape of an annular disk, is installed on the side of the coil support (7, 32, 27), towards the second valve (16, 15, 13), and is made of a magnetically conductive material. The outer conduction elements (33 and 26), in the shape of annular disks, are dimensioned so that their outer annular surfaces are in contact with the inner wall of the tubular conduction element (30), and their inner annular surfaces are in contact with the outer casing surface of the armature-guiding tube (7). The coil (29), the armature-guiding tube (7), the core (11), the two armatures (8 and 13), as well as the tubular conduction element (30) and the two conduction elements (33 and 26), constitute a solenoid apparatus (29, 7, 8, 13, 33, 26, 11), for simultaneous actuation of the two valves (5, 6, 8 and 16, 15, 13).

The solenoid apparatus (29, 7, 8, 13, 33, 26, 11) is located in a recess (14) of the housing (1, 19), with very little clearance. Two electrical contact elements (28), of which only one is shown, are located on the second surrounding projection (27) of the coil support (7, 32, 27), and extend through an opening (31) in the wall of the housing (1, 19). The contact elements (28) serve as electrical connections between the coil (29) and an external electrical installation, e.g., a voltage source and a switch, which are not shown.

The end of the armature-guiding tube (7) towards the first valve (5, 6, 8) extends into an opening in the bottom of the first housing part (1), which contains the valve seat (5) of the first valve (5, 6, 8). A sealing ring (34), is pressed sealingly on the one hand, against the outer casing surface of the armature-guiding tube (7), and on the other hand, against the wall delimiting the opening. Sealing ring (34) seals off a chamber (4), formed by the opening against the recess (14) of the housing (1, 19). A housing channel is connected to the chamber (4), and serves as a pressure fluid outlet (38) for the first valve (5, 6, 8). An additional housing channel, which is connected to the ring-shaped first valve seat (5), serves as a pressure fluid inlet (3), for the first valve (5, 6, 8).

The end of the armature-guiding tube (7) towards the second valve (16, 15, 13) extends into a recess in the bottom of the second housing part (19), which contains the valve seat (16) of the second valve (16, 15, 13). A sealing ring (25), which presses sealingly on the one hand, against the outer casing surface of the armature-guiding tube (7), and on the other hand, against the wall delimiting the recess, seals off a chamber (17), formed by the opening against the recess (14) of the housing (1, 19). A pressure housing channel serving as a fluid outlet (21) of the second valve (16, 15, 13) is connected to the chamber (17). Another housing channel, which is connected to the ring-shaped second valve seat (16), serves as a pressure fluid inlet (20) of the second valve (16, 15, 13). A pressure fluid channel (2, 18), in the form of a housing channel, connects the pressure fluid inlet (3) of the first valve (5, 6, 8) to the pressure fluid inlet (20) of the second valve (16, 15, 13). The pressure fluid channel (2, 18) consists of a first channel portion (2), located in the first housing part (1), and of a second channel portion (18), located in the second housing part (19). The connecting point of the two channel portions (2 and 18) is surrounded by a sealing ring (10), so that the pressure fluid can not reach either the atmosphere, or the interior of the housing, in an uncontrolled manner.

The pressure fluid inlet (3) of the first valve (5, 6, 8) is connected, via a first pressure fluid connection (39) of the housing (1, 19) and a pressure fluid channel (40), to the pressure fluid outlet of, e.g., an electromagnetically actuated 3/2-way valve (41). The pressure fluid inlet of the 3/2-way valve (41) is connected via a pressure fluid channel (43) to a compressed-air reservoir (42), serving as a pressure fluid source. The pressure fluid outlet (38) of the first valve (5, 6, 8) is connected via a second pressure fluid connection (37) of the housing (1, 19) and a pressure fluid channel (36), to a pressure fluid chamber (35) of a first end-user. A pressure fluid chamber (24) of a second end-user is connected, via a pressure fluid channel (23) and a third pressure fluid connection (22) of the housing (1, 19), to the pressure fluid outlet (21) of the second valve (16, 15, 13).

The operation of the above-described solenoid valve apparatus is explained in further detail below.

According to the drawing, the first valve (5, 6, 8) and the second valve (16, 15, 13) are shown in their closed position, in which the valve elements (6, 8 and 15, 13) are held by the force of their associated springs (9, 12, respectively) against their assigned valve seats (5, 16, respectively). The second pressure fluid connection (37) and the third pressure fluid connection (22) are thus sealed off from each other, and also from the first pressure fluid connection (39). Consequently, the pressure fluid chambers (35 and 24) of the two end-users are also sealed off from each other, by means of the two valves (5, 6, 8 and 16, 15, 13), and also from the first pressure fluid connection (39) of the housing (1, 19). The 3/2-way valve (41) is in a switch position such that it seals off the compressed-air reservoir (42) from the first pressure fluid connection (39), and connects the first pressure fluid connection (39) to a compressed-air sink (the atmosphere).

The compressed-air inlets (3 and 20) of the two valves (5, 6, 8 and 16, 15, 13, respectively), which are connected to each other and to the first pressure fluid connection (39), are thus connected to the compressed-air sink.

If the amount of compressed air in the pressure fluid chambers (35 and 24) of the end-users is to be reduced, a voltage is applied to the electrical contact elements (28) of the solenoid apparatus (29, 7, 8, 13, 33, 26, 11), via an electrical circuit, which is not shown. The resultant magnetic field build up causes the first armature (8), serving as valve element (8, 6) of the first valve (5, 6, 8), to move against the force of the first spring (9) and away from the first valve seat (5), while the second armature (13), serving as valve element (13, 15) of the second valve (16, 15, 13), is caused to move against the force of the second spring (12) and away from the second valve seat (16). The second pressure fluid connection (37) and the third pressure fluid connection (22) are thus connected to each other, and to the first pressure fluid connection (39), via the two valves (5, 6, 8 and 16, 15, 13), which are now open. Compressed air from the pressure fluid chamber (35) then flows through the first valve (5, 6, 8), the first pressure fluid connection (39), the pressure fluid channel (40), and the open outlet valve of the 3/2-way valve (41), into the atmosphere. At the same time, compressed air flows from the pressure fluid chamber (24) of the second end-user through the second valve (16, 15, 13) and the pressure fluid channel (18, 2), to the first pressure fluid connection (39), from where it flows through the pressure fluid channel (40) and the open outlet valve of the 3/2-way valve (41) into the atmosphere.

If the compressed-air reduction is to be terminated, the electrical circuit is actuated in such manner that the voltage at the electrical contact elements (28) is reduced. The magnetic field of the solenoid apparatus (29, 7, 8, 13, 33, 26, 11) then decreases. The force of the first spring (9), acting upon the first armature (8), and the force of the second spring (12), acting upon the second armature (13), then cause the two armatures (8 and 13), serving as valve elements (6, 8 and 15, 13), to move in the direction of their assigned valve seats (5 and 16), and to come into contact with same. The first valve (5, 6, 8) and the second valve (16, 15, 13) are then again in their closed positions. The pressure fluid chambers (35 and 24) of the two end-users are thus shut off from each other, and from the atmosphere.

If compressed air is to be brought into the pressure fluid chambers (35 and 24), the 3/2-way valve (41) is switched over in such manner that it switches the pressure fluid connection (39), and thereby the pressure fluid inlets (3 and 20) of the two valves (5, 6, 8 and 16, 15, 13, respectively), from the atmosphere to the compressed-air reservoir (42). Compressed air from the compressed-air reservoir (42) flows through the now open inlet valve of the 3/2-way valve (41), to the first pressure fluid connection (39), and to the pressure fluid inlet (3) of the first valve (5, 6, 8). At the same time, compressed air flows from the pressure fluid inlet (3) of the first valve (5, 6, 8), through the pressure fluid channel (2, 18), and to the pressure fluid inlet (20) of the second valve (16, 15, 13). If a voltage is now applied to the coil (29) of the solenoid apparatus (29, 7, 8, 13, 33, 26, 11), the two armatures (8 and 13), serving as valve elements (8, 6 and 13, 15), are influenced in such manner by the force of the increasing magnetic field, that they move against the force of their assigned springs (9, 12) in the direction of their respective assigned valve seats (5, 16). Compressed air then flows through the open first valve (5, 6, 8), from the first pressure fluid inlet (3), to the first pressure fluid outlet (38), and from the latter into the pressure fluid chamber (35) of the first end-user. At the same time, compressed air flows from the pressure fluid inlet (20), through the open second valve (16, 15, 13), to the second pressure fluid outlet (21), and from the latter into the pressure fluid chamber (24) of the second end-user.

When the desired amount of compressed air has been fed into the pressure fluid chambers (35 and 24) of the two end-users, the voltage is removed from the solenoid apparatus (29, 7, 8, 13, 33, 26, 11), and from the 3/2-way valve (41). The force of the first spring (9) presses the first valve element (8, 6) against its assigned first valve seat (5). At the same time, the second valve element (13, 15) is pressed by the force of the second spring (12) against its assigned second valve seat (16). The first valve (5, 6, 8) and the second valve (16, 15, 13) of the solenoid apparatus (29, 7, 8, 13, 33, 26, 11) are then in their closed positions. Thus, the pressure fluid chamber (35) of the first end-user and the pressure fluid chamber (24) of the second end-user are shut off from each other, and also from the first pressure fluid connection (39) of the housing (1, 19), and thereby, from the compressed-air reservoir (42).

The 3/2-way valve (41) has been switched over almost simultaneously during the above-described processes, and in such manner that it shuts off the first pressure fluid connection (39) of the housing (1, 19), and thereby the pressure fluid inlets (3 and 20) of the two valves (5, 6, 8 and 16, 15, 13), from the compressed-air reservoir (42), and connects them to the atmosphere.

The inventive solenoid valve apparatus has a dual function. On the one hand, it is possible to simultaneously fill the pressure fluid chambers of two end-users with a pressure fluid, or to simultaneously reduce the pressure fluid quantity in these pressure fluid chambers. On the other hand, the pressure fluid chambers of the two end-users are shut off from each other, and from the pressure fluid source or the pressure fluid sink, when no change in pressure fluid quantity is desired in the pressure fluid chambers of the end-users.

In the inventive solenoid valve apparatus, bores can be provided in the outer casing surface of the core and, if necessary, in the outer casing surface of the armature. Bores can also be provided in the wall of the armature-guiding tube, extending in the direction of the longitudinal axis, to assume the function of throttle bores. Such throttle bores cause an evening out of pressure to take place over a longer period of time between the pressure fluid chambers of the two end-users, but without allowing briefly occurring pressure changes in one of the two pressure fluid chambers to result in an evening out of the pressure. The throttle bores can also be formed by bores with very small cross-sections, going through the core, and possibly through the armatures as well.

The two springs (9 and 12), which push the armatures (8 and 13) in the closing direction of their assigned valves (5, 6, 8 and 16, 15, 13), can bear directly or indirectly, i.e., via an intermediate element, upon the core (11) or the plastic wall.

The springs (9 and 12) can also bear outside the coil (29) upon the surrounding projections (32, 27) of the coil support (7, 27, 32), and push collars, provided on the armatures (8, 13), in the direction of the valve seats (5, 16).

The tubular conduction element (30) may also be replaced by one or several band-like or rod-like conduction elements, made of a magnetically conductive material, which extend in the direction of the longitudinal axis of the coil (29), and are located on the outer casing surface of the coil (29).

In accordance with the present invention, it is also possible to replace the tubular conduction element (30) and one annular disk conduction element (33 or 26) by a pot-shaped conduction element, which then serves to receive the coil (29).

Also, in accordance with the present invention, it is possible to make the housing (1, 19) of the solenoid apparatus (29, 7, 8, 13, 33, 26, 11), or at least a housing part containing the solenoid apparatus (29, 7, 8, 13, 33, 26, 11), of a magnetically conductive material, and to install the coil (29) in such manner, that the housing (1, 19) serves as a conduction element (outer yoke), which then replaces the tubular element and the conduction elements (33, 26) as well.

The inventive solenoid valve apparatus can also be configured in a different manner from that which is shown in the above described embodiment example. The housing channel for the connection between the pressure fluid inlet of the first valve and the pressure fluid inlet of the second valve can, for instance, be replaced by pressure fluid channels installed within the housing, or outside the housing.

In addition, the armature-guiding tube may be, as described, part of the coil support, or it may consist of a separate tubular body, which is inserted into the coil support.

The movable valve elements of the two valves (5, 6, 8 and 16, 15, 13) can be formed by the two armatures (8 and 13), whereby the armatures (8 and 13) are then advantageously provided with a sealing element (6 and 15, respectively). It is also possible to omit the installation of sealing elements on the armatures, if the valve seats are provided with a material suitable for sealing, or if they are made of such a material. In addition, it is possible to omit the sealing elements if the movable valve elements are separate components, and are merely connected in such manner for interaction with the armatures, or may be connected in such manner that they are driven by the armatures.

In accordance with the present invention, the valves may also be designed so that they are actuated by means of levers, e.g., tilting levers, which are driven by the armatures in opposition to a reset force, e.g., springs. In such an embodiment, the valves are not coaxial with the armatures.

Also, in accordance with the present invention, it is possible to install the first armature between its assigned valve seat and the one end of the coil across from same, and the second armature between its assigned valve seat and the other end of the coil across from same. The dimension of the core, in the direction of its longitudinal axis, must then be such that it extends at least into the proximity of the ends of the coil.

In accordance with the present invention, the solenoid apparatus may also be provided with two coils, whereby the two coils are then assigned respectively to the two armatures. In such an embodiment of the solenoid valve apparatus, the two valves can be actuated together or independently from each other, so that the two end-users can be selectively actuated together or independently. A solenoid valve apparatus of this type has the same simple structure as that of the above described solenoid valve apparatus, with each of the two armatures being surrounded over at least part of its axial extension by one of the two coils.

It is however significant, for any imaginable embodiment of the present invention, that the two valves are positioned across from each other, and that the two armatures are located between the two valves (boxer arrangement). Furthermore, the two valves (5, 6, 8 and 16, 15, 13) are configured and placed in such manner that two end-users can be connected selectively to a pressure fluid source or a pressure fluid sink, or can be shut off from both, whereby the possibility also exists that, during these processes, the two end-users are connected to each other, or shut off from each other.

The inventive solenoid valve apparatus can be operated in all installations and plants which use a pressure fluid, such as compressed air, or hydraulic oil.

The so-called "end-users" may be work cylinders or bearing elements, by means of which a varying load is supported.

When using the inventive solenoid valve apparatus, the end-users are considered shut off from each other when they are connected to each other via a throttle opening in the armatures, in the core, or in the armature-guiding tube when the first and second valves are closed.

The pressure fluid inlets of the two valves may be connected to a common pressure fluid source, as indicated in the above described embodiment example. However, it is also possible to connect either of the two pressure fluid inlets to a separate pressure fluid source.

In short, a simple, compact solenoid valve apparatus is disclosed, with which it is possible to selectively connect two end-users to a pressure fluid source, or to close off the two end-users from the pressure fluid source.

The above described embodiments of the invention are intended to be illustrative only. Numerous alternative embodiments may be devised by those skilled in the art without departing from the spirit and scope of the following claims.

I claim:

1. A solenoid valve apparatus for connecting first and second end-users to a pressure fluid source, comprising:

a first valve having a first valve seat and a first movable valve element, and a second valve having a second valve seat and a second movable valve element;

a first pressure fluid inlet and a first pressure fluid outlet connected to said first valve, and a second pressure fluid inlet and a second pressure fluid outlet connected to said second valve;

a solenoid apparatus which actuates said first valve and said second valve, said solenoid apparatus comprising a first armature which actuates said first valve, a second armature which actuates said second valve, and a coil;

wherein said first armature and said second armature are approximately coaxial with each other;

wherein said first armature and said second armature are located between said first and second valves, said first and second armatures each being movable in the direction of, or away from, its respective valve; and wherein said first pressure fluid outlet is connected to said first end-user, and said second pressure fluid outlet is connected to said second end-user.

2. The solenoid valve apparatus of claim 1, wherein said first movable valve element of said first valve comprises said first armature, and said second movable valve element of said second valve comprises said second armature.

3. The solenoid valve apparatus of claim 1, wherein said first armature is pushed by a first spring in a closing direction of said first valve; and wherein said second armature is pushed by a second spring in a closing direction of said second valve.

4. The solenoid valve apparatus of claim 1, wherein said coil is disposed so that it surrounds said first and second armatures over at least part of their axial extension.

5. The solenoid valve apparatus of claim 1, wherein a core, made of a magnetically conductive material, is located between said first and second armatures.

6. The solenoid valve apparatus of claim 5, wherein said core and said first and second armatures have a throttle bore opening on a longitudinal axis, through which said first and second pressure fluid outlets are connected to each other.

7. The solenoid valve apparatus of claim 1, wherein said coil is a first coil and said solenoid apparatus further comprises a second coil, wherein said first and second coils are electromagnetically linked with said first and second armatures, respectively.

8. The solenoid valve apparatus of claim 7, wherein each of said first and second armatures is located between its corresponding valve seat and an end of its respective coil across from its corresponding valve seat; and wherein said core is dimensioned longitudinally so that it extends to the immediate proximity of said end of said respective coil.

9. The solenoid valve apparatus of claim 1, wherein said first and second valves and said first and second armatures are approximately coaxial with each other; and wherein said first and second armatures are located in an armature-guiding tube, which is surrounded over at least part of its axial extension by said coil, and wherein said first and second armatures are moved in the direction of the longitudinal axis of said armature-guiding tube.

10. The solenoid valve apparatus of claim 9, wherein said core and said armature-guiding tube have a throttle bore opening on a longitudinal axis, through which said first and second pressure fluid outlets are connected to each other.

11. The solenoid valve apparatus of claim 1, wherein said first pressure fluid inlet is connected via a pressure fluid channel to said second pressure fluid inlet.

12. The solenoid valve apparatus of claim 11, wherein said first valve, said second valve, said first and second armatures, and said first coil are located within a housing; and wherein said pressure fluid channel is also located within said housing.

13. The solenoid valve apparatus of claim 1, further comprising a first outer conduction element, comprised of a magnetically conductive material, which extends on the outer circumference of said coil in the direction of the longitudinal axis of said first coil.

14. The solenoid valve apparatus of claim 13, wherein said first outer conduction element is a first housing portion, and wherein said first housing portion is magnetically conductive and at least partially surrounds said solenoid valve apparatus.

15. The solenoid valve apparatus of claim 13, further comprising at least one additional outer conduction element attached to said coil, said at least one additional outer conduction element being magnetically conductive, and being connected in a magnetically conductive manner to said first outer conduction element.

16. The solenoid valve apparatus of claim 15, wherein said at least one additional outer conduction element is an additional housing portion, wherein said additional housing portion is magnetically conductive, and at least partially surrounds said solenoid valve apparatus.

17. The solenoid valve apparatus of claim 15, wherein said first outer conduction element is a tubular element, and is coaxial with said first and second armatures and said coil, and surrounds said coil; and wherein said at least one additional outer conduction element is an annular disk, and is connected magnetically to said first outer conduction element.

* * * * *